United States Patent [19]
Pfaff et al.

[11] Patent Number: 5,730,378
[45] Date of Patent: Mar. 24, 1998

[54] FILMSTRIP TAKE-UP CHAMBER

[75] Inventors: Douglas Joseph Pfaff; Robert S. Jones, both of Rochester, N.Y.

[73] Assignee: Eastman Kodak Company, Rochester, N.Y.

[21] Appl. No.: 616,610

[22] Filed: Mar. 15, 1996

Related U.S. Application Data

[60] Provisional application No. 60/003,278, Aug. 25, 1995.

[51] Int. Cl.$^6$ ............................................. G03B 27/62
[52] U.S. Cl. ................................... 242/332; 355/75
[58] Field of Search ............................. 242/332, 348, 242/348.3, 535.1; 355/75; 358/496, 498

[56] References Cited

U.S. PATENT DOCUMENTS

| | | | |
|---|---|---|---|
| 3,057,573 | 10/1962 | Kindig et al. | |
| 3,700,188 | 10/1972 | Bradford et al. | 212/194 |
| 3,810,588 | 5/1974 | Mahoney | |
| 3,829,203 | 8/1974 | Novak | 352/78 R |
| 3,900,109 | 8/1975 | Katooka et al. | 355/75 |
| 3,900,169 | 8/1975 | Robertson | |
| 4,012,004 | 3/1977 | Tonellato | |
| 4,461,554 | 7/1984 | Norris et al. | 242/348.3 |
| 4,469,291 | 9/1984 | Treiber et al. | 242/418 |
| 4,544,110 | 10/1985 | Nagel et al. | 242/534 |
| 5,012,346 | 4/1991 | DeJager et al. | 358/214 |
| 5,083,155 | 1/1992 | Kataoka et al. | 355/75 |
| 5,162,840 | 11/1992 | Benker et al. | 355/32 |
| 5,328,032 | 7/1994 | Gedalovitz | 206/455 |
| 5,335,873 | 8/1994 | Harris et al. | 242/348 |
| 5,461,492 | 10/1995 | Jones | 358/487 |
| 5,465,134 | 11/1995 | Palmer et al. | 355/75 |

*Primary Examiner*—John P. Darling
*Attorney, Agent, or Firm*—Raymond L. Owens

[57] ABSTRACT

A take-up chamber for receiving an elongated filmstrip having a predetermined width between the longitudinal edges thereof and an image area less than the width. The take-up chamber has a chamber housing for accommodating the filmstrip within the chamber. The housing has first and second side walls spaced apart to accommodate the width of the filmstrip, a lateral wall extending between the first and second side walls, and a slit extending through the lateral wall and between the first and second side walls through which the filmstrip may be introduced or withdrawn from the chamber. Two parallel laterally spaced generally circular guides extend the inside of said chamber from adjacent one side of the slit to the other side of the slit. Each guide has a substantially continuous inner surface, to contact only respective longitudinal edges of a filmstrip and cause the filmstrip to wind into a roll within the chamber as the filmstrip is advanced through the slit.

A scanner having using such a take-up chamber is also provided.

19 Claims, 12 Drawing Sheets

FILMSTRIP TAKE-UP CHAMBER

CROSS REFERENCE TO RELATED APPLICATION

Reference is made to and priority claimed from U.S. Provisional application Ser. No. 60/003,278, filed 25 Aug. 1995, entitled FILMSTRIP TAKE-UP CHAMBER.

FIELD OF THE INVENTION

This invention relates to a filmstrip take-up chamber which can passively receive films strips, particularly from a scanner, and allows them to be withdrawn.

BACKGROUND OF THE INVENTION

Conversion of analog images into digital data has become widespread for a variety of applications, including storing, manipulating, transmitting and displaying or printing copies of the images. For example, images captured in photographic media are being converted to digital data and stored on compact discs for readout and display as a video image or for printing with various types of color printers. In order to capture the photographic image digitally, the image frame is scanned with a light beam or line, and the light transmitted through the image is detected, typically as three primary color light intensity signals, and digitized. The digitized values may be formatted to a standard for video display and stored on compact disc or magnetic media. Such film digitizers take a variety of forms and the various common aspects of film digitizing, particularly line illumination and linear CCD-based digitizers, are described in greater detail in commonly assigned U.S. Pat. No. 5,012,346.

In order to perform line scanning of an image frame of photographic filmstrips, it is necessary to provide an accurate film transport mechanism to transport a filmstrip into a scanning gate and hold the image frame flat in alignment with a scanning aperture. Typically, the linear CCD array and scanning light beam are stationary so that the light beam illuminates a line of the filmstrip image frame, and a line of digitized data is stored. The scanning gate is incrementally moved line-by-line until the entire image frame is digitized. Then a new image frame is positioned and flattened for scanning and digitizing. Such a scanning and digitizing system for Photo-CD conversion is embodied in the KODAK® PIW Model 2400 Photo-CD scanner system marketed by the assignee of this application, as well as in allowed U.S. patent application Ser. No. 08/201,282, now U.S. Pat. No. 5,461,492, entitled "Film Scanner with In-Line Dual Scanning Gates". That application and all other references cited in the present application, are incorporated herein by reference.

In the KODAK® PIW Model 2400 Photo-CD scanner, the scanning plane is vertical and the stationary scanner components are oriented horizontally. A translation stage advances the film scanning gate past the stationary scanner components in a first pass for scanning the clamped image frame at a low resolution sufficient to provide a video display of the image frame on a monitor for viewing by the operator. The color balance of the scanned and digitized image pixel date is automatically adjusted to the color balance characteristics of the video display. The operator may further adjust the displayed color balance or tone and intensity of the color display while viewing the result of the adjustments until satisfied, whereupon the adjustment factors for that image frame are stored. The orientation of the image may also be stored with the digitized data so that the CD player can rotate the image data 90° for display as a video image at the same aspect that the image was captured by the photographer.

As each image frame is scanned in this first pass, the scanned image frames of the vertically oriented filmstrip are advanced into a stationary take-up chamber. The take-up chamber is provided within the scanner to temporarily hold the filmstrip and isolate it from other apparatus that it could catch on and to keep it clean. After all image frames are scanned, the trailing end of the filmstrip is retracted from the chamber and advance in the reverse direction into the scanning gate one frame at a time. Then each image frame is scanned at high resolution for digitizing the image as a field of data associated to the data derived in the low resolution scan of the same image frame. The filmstrip is transported out the exit of the translation stage for removal by the operator when scanning of all frames is completed.

The relatively large, hollow, circular, take-up chamber has no moving parts and is fixed in position in the transport path with a film receiving slot positioned adjacent to an end of the translation stage. The filmstrip entering its slot is advanced and retracted during and between each scanning cycle through the movement of the translation stage. This movement can cause foreign particles, for example, dusts to enter the chamber.

Within the interior cavity of the take-up chamber, the filmstrip is unrestrained and coils up against itself and the chamber walls. Since the filmstrip can tangle or catch in restricted spaces, for example the slot, friction may be introduced in the transport path that affects the proper centering of the image frame in respect to the scanning aperture and flattening of the image frame during the incremental operation of the translation stage. The filmstrip could also be scratched or damaged when being pulled into or out of the chamber slot. The chamber is sized relatively large in order to minimize the binding and scratching of the filmstrip.

It would be desirable then, to provide a film take-up chamber which is constructed to protected a filmstrip from contamination and which allows easy entry and retraction of a filmstrip, with low probability of the filmstrip jamming, binding, catching or becoming scratched by, portions of the chamber iteself. Ideally, this should be the case even for filmstrips with some degree of transverse or longitudinal curls or torn perforated edge portions or splices.

It would be desirable then to have a filmstrip take-up chamber that is compact and simple in construction, which has a low tendency to scratch, jam, or bind filmstrip therein, which can protect the filmstrip from contamination, and which could receive filmstrips which may have some transverse or lengthwise curl.

SUMMARY OF THE INVENTION

The present invention provides a take-up chamber for receiving an elongated filmstrip having a predetermined width between the longitudinal edges thereof. The chamber comprises a chamber housing for accommodating the filmstrip within the chamber. The housing has first and second side walls spaced apart to accommodate the width of the filmstrip, a lateral wall extending between the first and second side walls, and a slit extending through the lateral wall and between the first and second side walls through which the filmstrip may be introduced or withdrawn from the chamber. The take-up chamber further comprises two parallel laterally spaced, generally circular guides extending around the inside of the chamber from adjacent one side of the slit to the other side of the slit. Each guide has a substantially continuous inner surface to contact only respective longitudinal edges of a filmstrip and cause the filmstrip to wind into a roll within the chamber as the filmstrip is advanced through the slit.

The present invention also provides a scanner for scanning image frames of a filmstrip advanced into a scanning station. The scanner comprises a scanner in the scanning station to scan the image frames of the filmstrip and derive image data related to the scanned image frame. A filmstrip translation stage of the scanner is located in the scanning station for translating each image frame of the filmstrip advanced into the scanning station past the scanner. The scanner further has a take-up chamber of the present invention having the slit positioned such that filmstrip advanced past the scanner may be introduced or withdrawn from the chamber.

Filmstip take-up chambers of the present invention can be relatively compact and simple in construction and receive filmstrip for storage, and protect a stored filmstrip from contamination, while allowing a stored filmstrip to be readily withdrawn. Furthermore, take-up chambers of the present invention have a low tendency to scratch, jam, or bind filmstrip therein, even filmstrips which may exhibit different transverse or longitudinal curls, or may have damage edge portions or splices.

EMBODIMENTS OF THE INVENTION

In the present application, it will be understood that words such as "upper", "lower", "sideways" and similar words of direction, are used in a relative sense only. Such descriptions are the actual directions though in reference to the orientation in which it is contemplated the present invention will be used, although other orientations during use are possible. Furthermore, reference to a "substantially continuous" inner surface means that any gaps or sudden changes in curvature of the inner surfaces should be avoided. Preferably this means that any changes in curvature of the inner surface should not, over a length of inner surface of about 5 mm, change in distance from a center defined by the inner surface, by more than 1 or 2 mm. Preferably, any gaps in the inner surface should be less than ½ of the thickness of a filmstrip which is to be accommodated by chamber 20. Typical filmstrip thicknesses are from 0.10 to 0.13 mm.

In take-up chambers of the present invention, it is preferred that the inner surface of each guide, as viewed in a cross section of the guide, is convex (thus, it will curve outwardly toward a filmstrip fed into the chamber). In other words, the "inner surface" is the surface facing the interior of the chamber and is the surface against which a filmstrip fed into the chamber through the slit will normally contact. In the embodiment particularly shown in FIGS. 2 through 5, for example, this is accomplished by the guides being of wire-like construction so as to have a circular cross section. However, to obtain such a convex shape there is obviously no limitation on the shape of an outer surface of the guide. Thus, a second embodiment below has flat guides each with a convex inner surfaces.

It is also preferred that a take-up chamber of the present invention has a filmstrip channel housing extending laterally outward from the chamber housing. The channel, at its laterally innermost end, is in communication with the slit and is dimensioned to guide the filmstrip lengthwise into the chamber. The filmstrip channel may be particularly constructed with opposed edge guides and spaced apart upper and lower surfaces therebetween so as to guide the edges of the filmstrip without the image area of a transversely curled film contacting the upper and lower surfaces. Such a channel preferably has a straight portion remote from the chamber which is non-tangential to the guides at the slit, and a curved transitional portion which curves from the straight portion toward a direction parallel with the tangent to the guides.

In one embodiment the guides may be wire-like with a circular cross-section. In a second embodiment, the guides may have a plurality of rollers spaced along each guide with the axis of each roller positioned radially outward from the inner surface of its corresponding guide, such that the arc of the roller surface extending beyond the inner guide surface defines an angle of less than 90 degrees (preferably less than 70 degrees).

Scanners of the present invention, which utilize a take-up chamber as described, preferably have a translation stage constructed to translate each image of a filmstip in a forward direction past a scanner station, to derive a first set of image data for each scanned image frame. The translation stage also translates the same scanned image frames of the filmstrip in a reverse direction past the scanner to derive a second set of image data for each such scanned image frame.

Referring to the drawings, each of the filmstrips 2 has a predetermined width between longitudinal edges 4. Typical filmstrip widths (that is, the distance between opposed edges 4) are approximately between 25 mm to 35 mm. Running lengthwise adjacent respective edges 4 are edge sections 5, each of which may optionally have a series of perforations 6 in a known manner. Filmstrips 2 each have an image area 8 which is the area in which an image on the filmstrip normally extends. Image area 8 has a width less than the width of filmstrip 2, and may be further divided longitudinally into a series of discrete image areas 10, each of which contains a single picture.

Figure 1A:
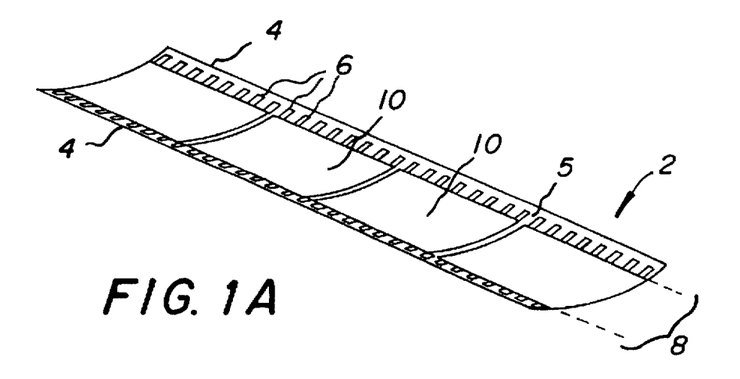
FIGS. 1A to 1E illustrate a filmstrip exhibiting various types of curls.
Figure 1B:
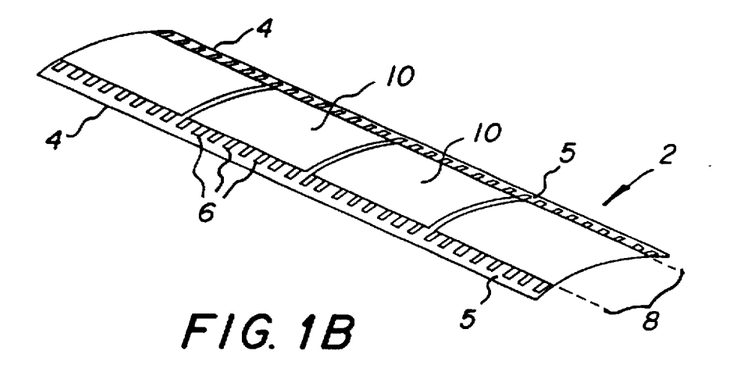
Figure 1C:
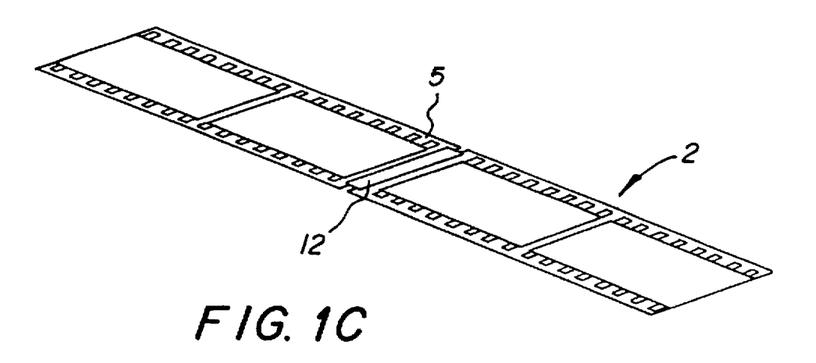
Figure 1D:
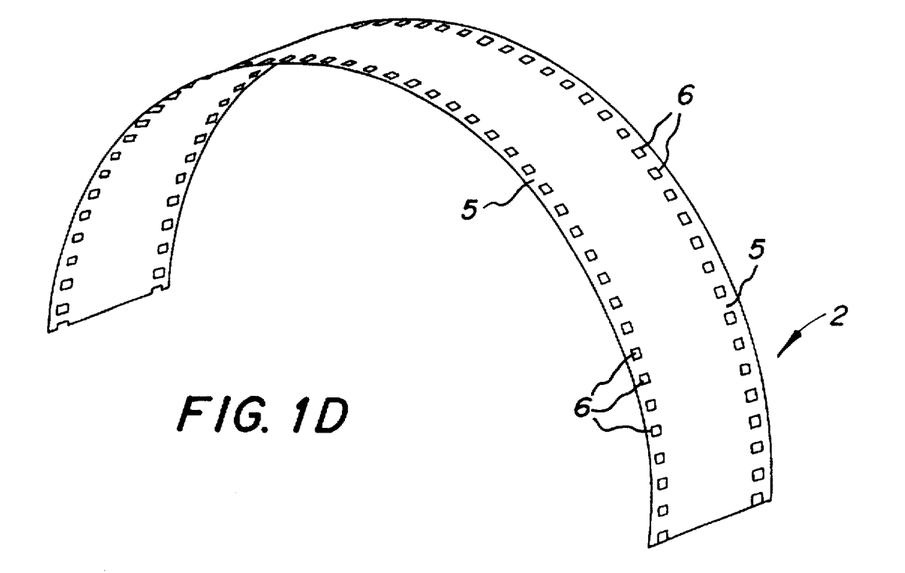
Figure 1E:
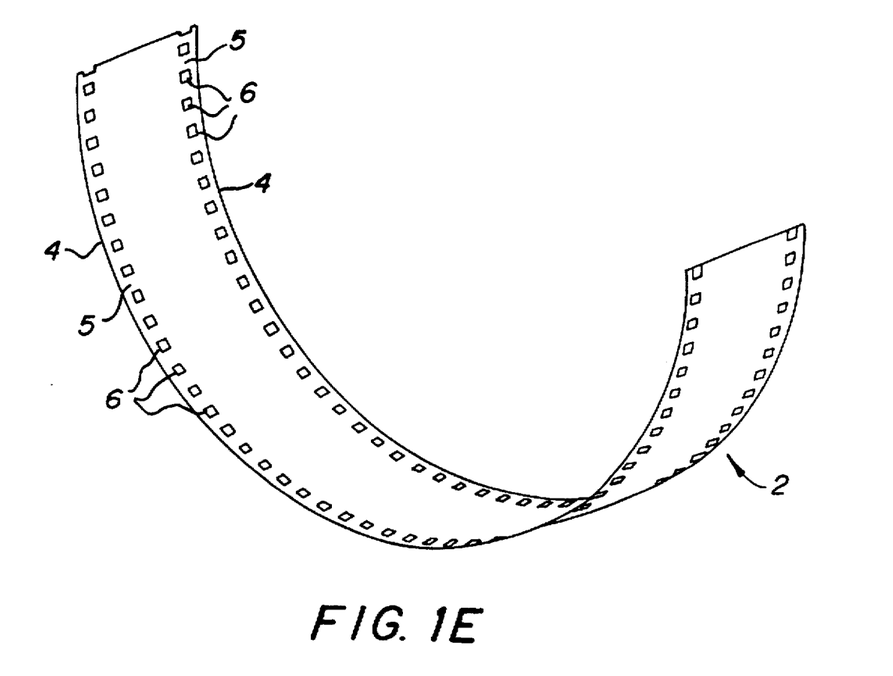

Filmstrip 2 of FIG. 1A has a transverse positive curve, that is it is concave in an upward direction as it would be fed into the take-up chamber as described below. The filmstrip of FIG. 1B also has a transverse curve, but transverse negative (that is, it is upwardly convex). FIG. 1C illustrates two filmstrips spliced together by splice 5 to form a single filmstrip. FIGS. 1D and 1E illustrate filmstrips 2 with longitudinal negative curve (that is, longitundinally upward convex), and longitudinal positive curve (that is, longitudinally upward concave). Any of the foregoing types of filmstrips may be encountered by a scanner and hence, a take-up chamber which receives filmstrips from such a scanner.

Referring to the first embodiment of a take-up chamber of the present invention as shown in FIGS. 2–5, the take-up chamber shown is generally designated 20. Chamber 20 has two half-sections 24, 42. Half-sections 24, 42 are normally joined by virtue of bolts 30 extending through openings in flanges 28 in half-section 24, into threaded openings 48 in flanges 46 of half-section 42. Other than for half-section 24 carrying bolts 30 and half-section 42 carrying threaded bores 48, half-sections 24, 42 are identical. Half-sections 24, 42 have respective side walls 26, 44 which define first and second side walls of chamber 20. Side walls 26, 44 are spaced apart to accomodate the width of a filmstrip 2 therebetween. In particular, side walls 26, 44 are spaced apart a distance just slightly greater than the width of filmstrip 2 which take-up chamber 20 will accommodate. Half-sections 24, 42 also have respective transverse wall portions 27, 50 which, when half-sections 24, 42 are joined, define a transverse wall 51 of chamber 20.

Figure 2:
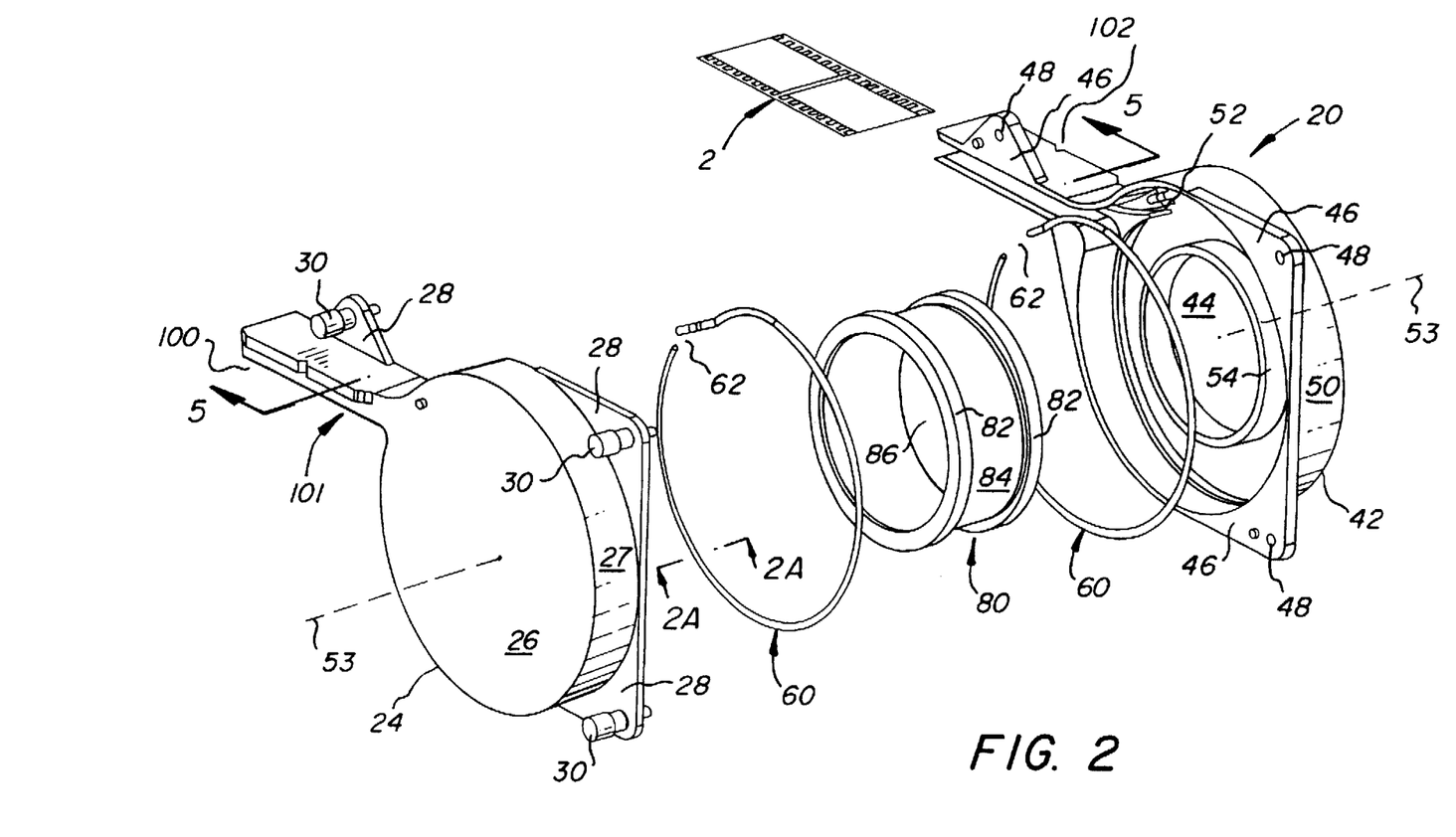
FIG. 2 is an exploded view of one embodiment of a take-up chamber of the present invention.
Figure 2A:
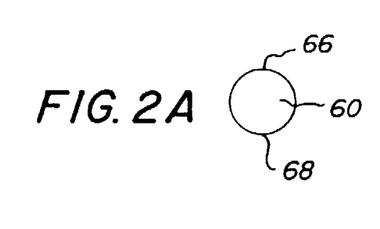

Chamber 20 has a slit 52 through which a filmstrip 2 can enter chamber 20.

Take-up chamber 20 further has two laterally spaced parallel guides 60, each of which are positioned adjacent respective side walls 26, 44. Guides 60 are preferably made of electro-polished stainless steel wire for low friction contact with edge sections 5 of a filmstrip 2. Guides 60 are both generally circular as shown in the drawings, and extend around the inside of the chamber from adjacent one side of slit 52 to the other side of slit 52. Gap 62 in each guide 60 is positioned adjacent slit 52.

Figure 3:
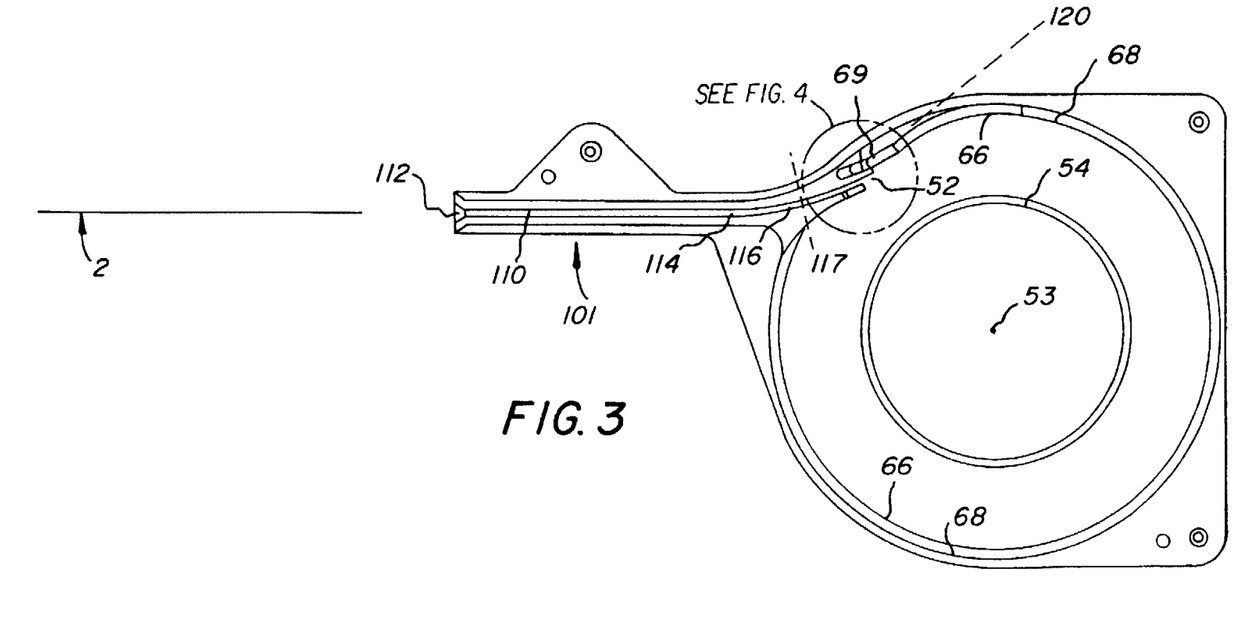
FIG. 3 is a vertical cross-section of the take-up chamber of FIG. 2.
Figure 4:
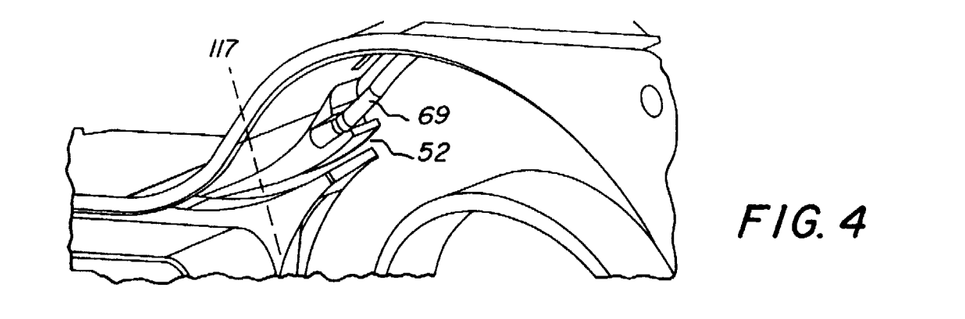
FIG. 4 is an enlarged view of a portion of FIG. 4.

While guides 60 are generally circular, both guides 60 do have a slightly S-shaped end 69 adjacent slit 52 as best shown in FIGS. 3 and 4. To provide the S-shaped portion, each end 69 extends first inwardly, then curves outwardly toward the remainder of generally circularly guides 60. Both guides 60 have a circular cross-section as seen in FIG. 2A, each having an inner surface 66 facing toward the interior of the chamber, and an outer surface 68 facing toward transverse wall 51. Due to the inner surfaces 66 of guides 60 being spaced inwardly from transverse wall 51 by approximately the thickness of guides 60, this in effect defines a channel between guides 60 which is of a depth approximately equal to the thickness of guides 60. This particularly allows a transverse negative curled filmstrip, such as shown in FIG. 1B, to be accomodated with its edge sections 5 riding on inside surfaces 66 without image area 8 contacting transverse wall 51.

The inner surface of each guide 66 is substantially continuous. This means that they need not be perfectly continuous and may have, for example, minor gaps. However, to reduce the chances of edge sections 5 of a filmstrip 2 catching on inner surfaces 66, any gaps in the continuity of the inner surface should be kept as small as possible.

Slit 52 is in communication with a laterally extending filmstrip channel 103 formed in a filmstrip channel housing 101. Housing 101 is formed from portions 100, 102 of half-sectons 24, 42 respectively. Channel 103 is dimensioned to guide a filmstrip through the slit 52 and into the chamber. In particular, channel 103 has a maximum width which is slightly greater than the width of a filmstrip to be stored in take-up chamber 20. Channel 103 has a straight portion 110 remote from the chamber housing and extending between an upward and downward flared opening 112 to a position at about 114. A curved portion 116 of channel 103 then extends from position 114 to slit 52. Straight portion 110 is non-tangential to guides 60 at the position of slit 52, while curved transitional portion 116 curves in a direction from straight portion 110 toward a direction parallel with a tangent to the guides at slit 52. That is, guides 60 at slit 52 have a tangent which is illustrated by broken line 120 in FIG. 3. Straight portion 110 is at an angle to line 120, while transitional portion 116 curves toward tangent 120 (and is preferably is substanially prallel to tangent 120 at slit 52).

Figure 5:
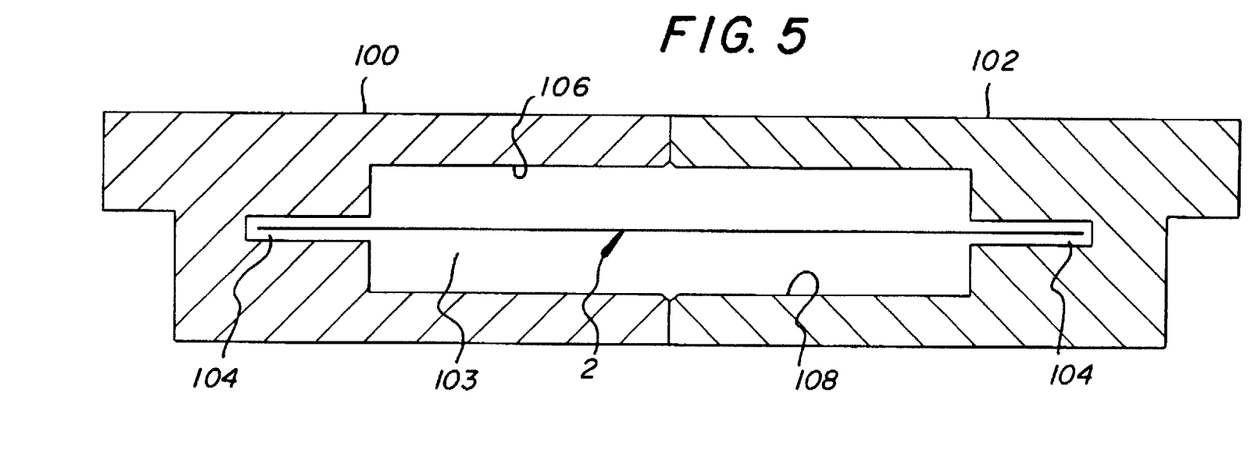
FIG. 5 is a vertical cross-section along line 5—5 of either the first embodiment of FIGS. 2-3 or a second embodiment of FIGS. 6-9.
Figure 6:
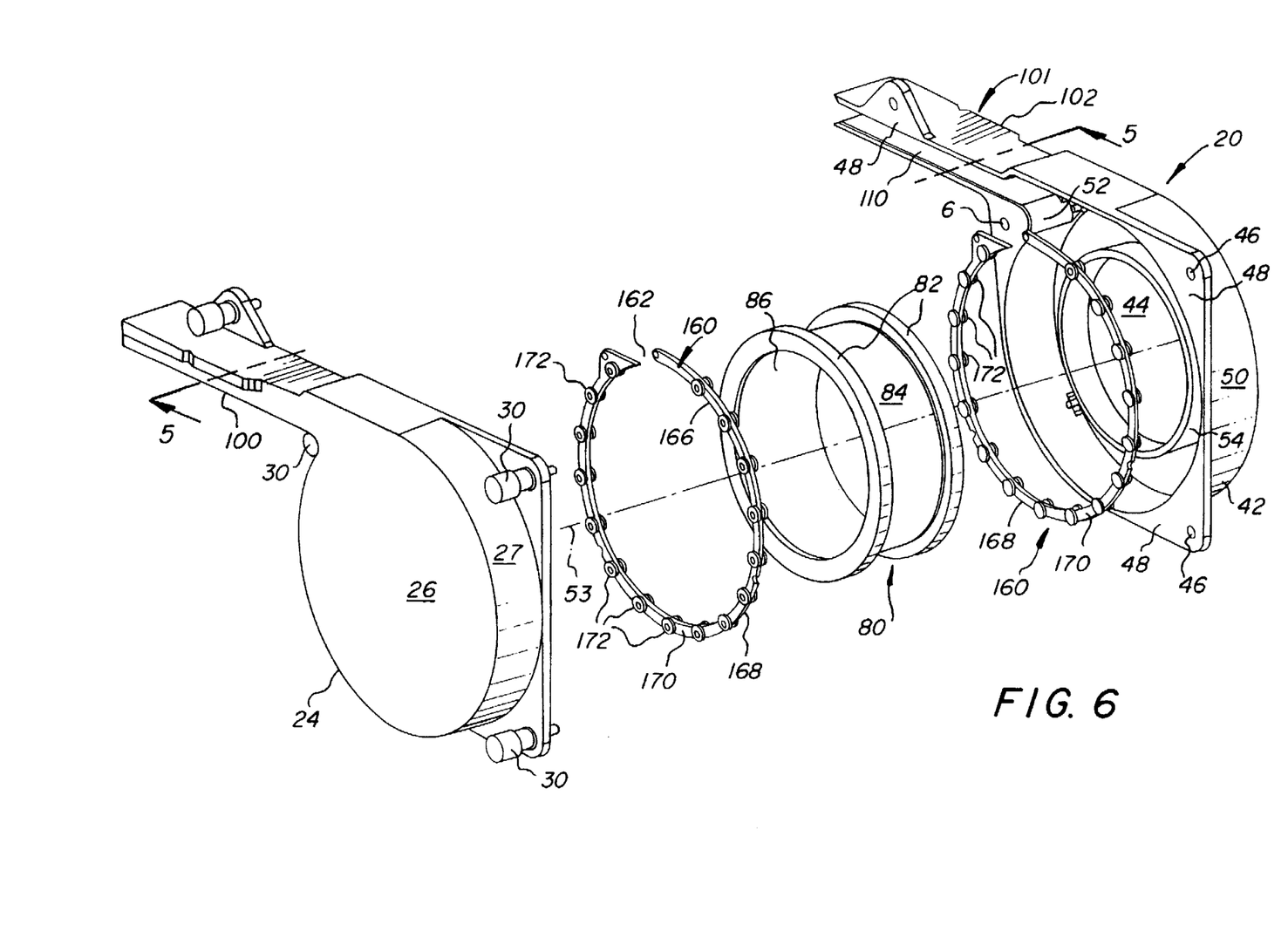
FIG. 6 is an exploded view of a second embodiment of a take-up chamber of the present invention.
Figure 7:
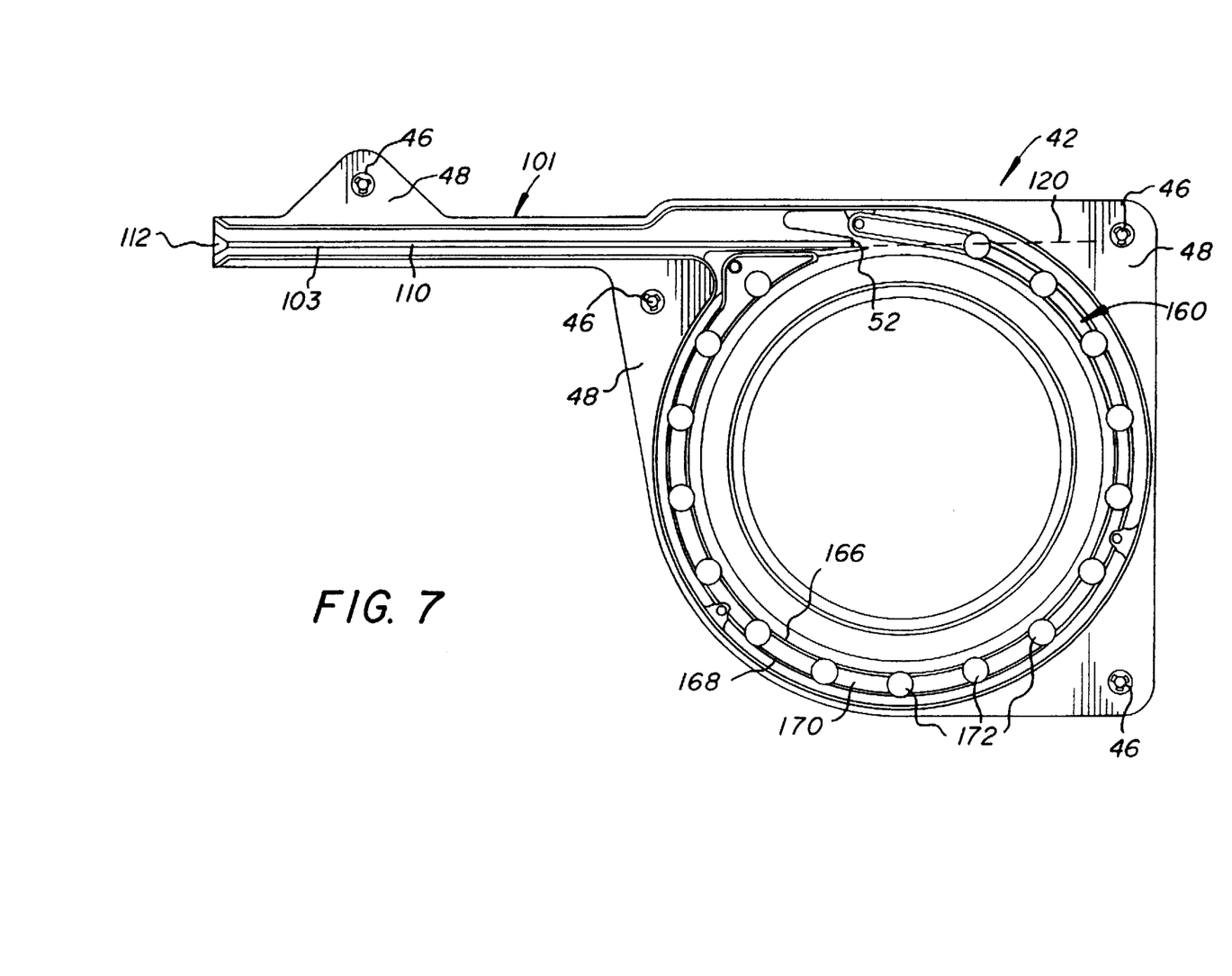
FIG. 7 is a vertical cross-section of the assembled take-up chamber of FIG. 6.
Figure 8:
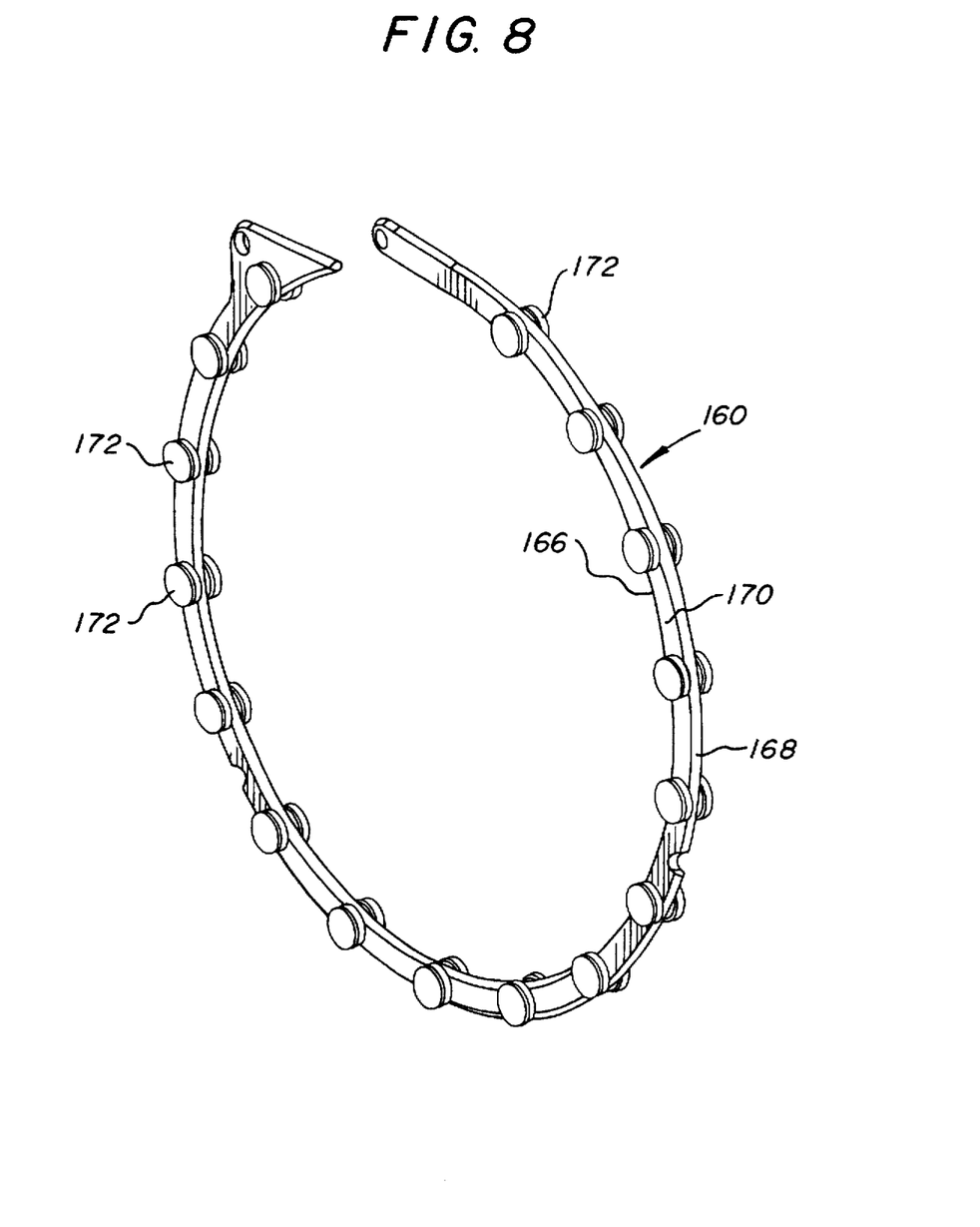
FIG. 8 is an enlarged perspective view of a guide of the take-up chamber of FIG. 6.
Figure 9:
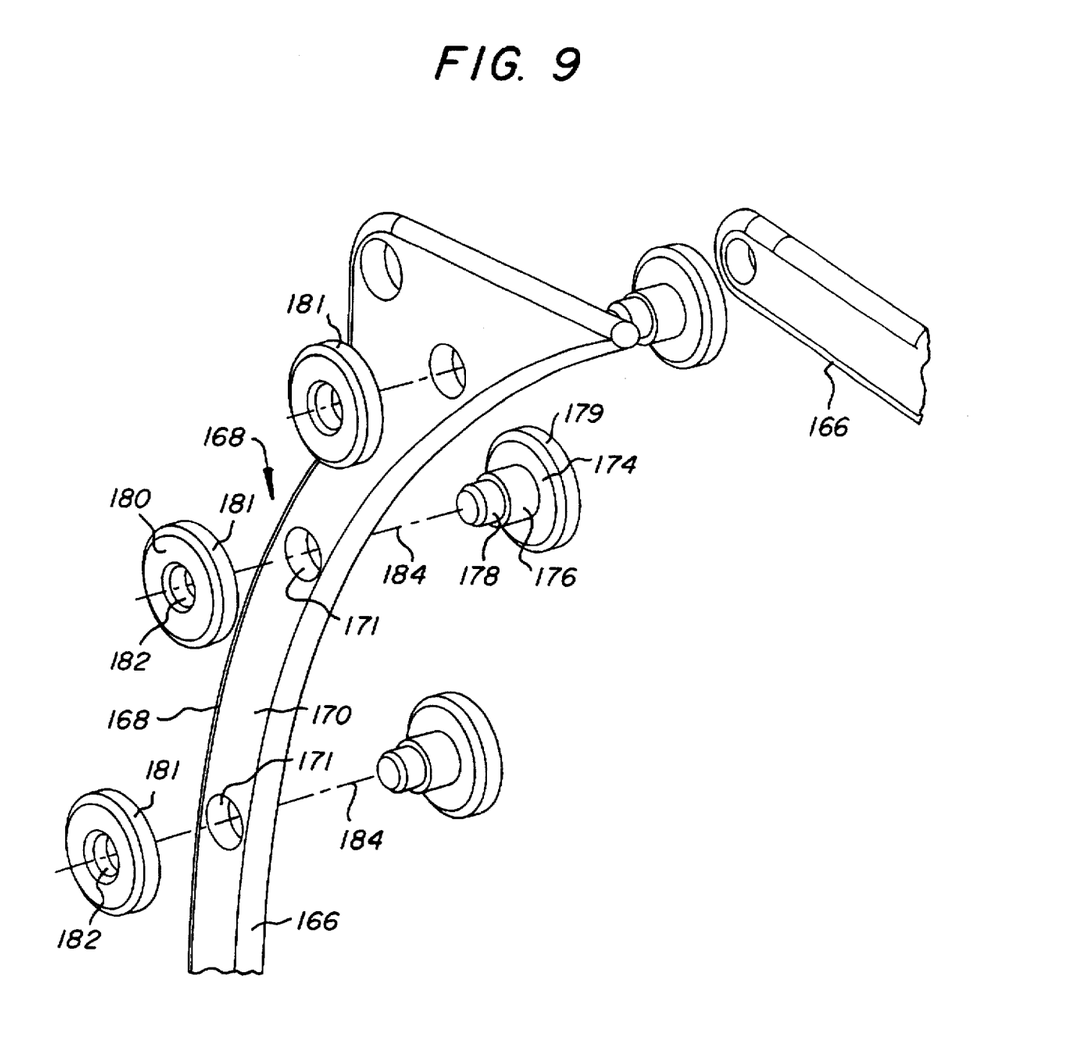
FIG. 9 is an enlarged perspective view of a portion of the guide shown in FIG. 8, with rollers shown disassembled.
Figure 10:
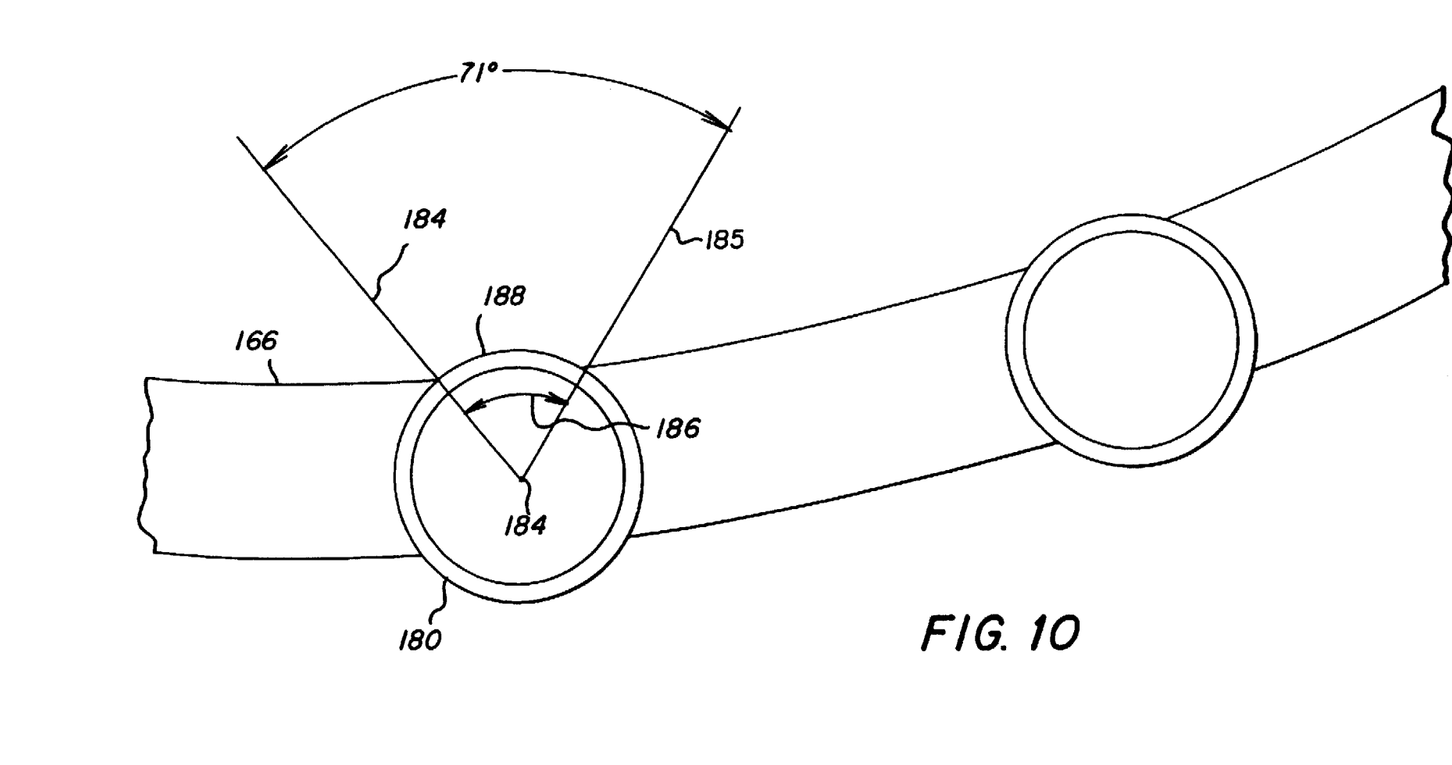
FIG. 10 is an enlarged elevation view of a roller on the guide of FIG. 8 which illustrates the positioning of the rollers.

Straight portion 110 and transitional portion 116 from postion 114 to about the position illustrated by broken line 117, has a cross-section as shown in FIG. 5. As shown in FIG. 5, the foregoing portions of channel 103 have spaced apart upper and lower surfaces 106, 108, respectively, and opposed edge guides 104. The remainder of channel 103 between position 117 and slit 52 has only edge guides 104, as best seen in FIGS. 3 and 4. The foregoing construction allows channel 103 to accommodate a filmstrip 2 with its edge sections 5 resting in, and being guided by edge guides 104, while an image area 8 of even a transversely curled film such as shown in FIGS. 1A and 1B, does not contact upper and lower surfaces 106, 108.

Each side wall 26, 44 has attached to it, a circular hub 54 as best seen in FIG. 2. Hubs 54 are centered about an axis of the chamber as represented by line 53. Only hub 54 on side wall 44 is visible in FIG. 2, but it will be understood that there is a Corresponding hub 54 on side wall 26. A cylindrical inner roller 80 has an open middle 86 of slightly greater diameter than hubs 54. Inner roller 80 has raised edge portions 82 and a lower central portion 84. Inner roller 80 is mounted over hubs 54 such that inner roller 80 extends between side walls 26 and 44 with raised edge portions 82 adjacent respective side walls, and can rotate within chamber 20. By virtue of the foregoing construction, it will be seen that edges of a transversely curled filmstrip 2 can contact raised edges 82 without the image area contacting central portion 84 of hub 80.

A second embodiment of a take-up chamber 20 of the present invention is illustrated by FIGS. 6–10 in particular. This embodiment is essentially identical to that of FIGS. 2–5, and corresponding parts have been numbered identically. However, in this second embodiment, filmstrip channel housing 101 is arranged so that straight portion 110 of filmstrip channel 103, is tangential to guides 160 at slit 52 (that is, straight portion 110 lies on tangent line 120). Therefore, in this second embodiment, there is no transitional curved portion 116 of channel 103.

Furthermore, in the second embodiment circular wire-like guides 60 of the first embodiment are replaced by circular, flat guides 160 in the second embodiment. Each of guides 160 has a continuous, convex, inner surface 166 extending from gap 162 adjacent slit 52 around the inside of the chamber back to the other side of slit 52. Each guide also has two opposed sides 170 extending between inner surface 166 and an outer surface 168. A plurality of rollers 172 are spaced along each guide 160. Rollers 172 can contact edge sections 5 of a filmstrip 2. An axis 184 of each roller (see FIG. 9 in particular) is positioned radially outward from inner surface 166 of corresponding guide 160, such that the arc of the roller surface extending beyond guide inner surface 166 defines an angle of about 71 degrees. This can be clearly seen in FIG. 10 where it can be seen that the arc 188 of each roller 172 extending inward beyond inner surface 166, extends between lines 185 and defines the foregoing angle 186 of about 71 degrees.

Each rollers 172 is made of two wheels 174 and 180 connected through an axle. The axle is defined by a wider portion 176 which is mounted to rotate within opening 171, and a thinner portion 178 dimensioned to snap into a corresponding opening 182 on a wheel 180. Thus, it is the outer surfaces 179, 181 of wheels 174, 180, respectively, which define the outer surface of each roller 172.

The take-up chamber 20 of either the first or second embodiments described above, may be constructed of any material. However, all of either take-up chamber 20, other than guides 60 or 160, can be conveniently constructed of plastic. Guides 60 or 160, in order to obtain a smooth finish on convex inner surfaces 66, 166, respectively, to keep friction with edge sections 5 of a filmstip low, may particularly be made of metal (for example, in the case of guides 60, a polished chrome plated wire).

In operation of a take-up chamber of the present invention, film is able to enter the chamber and be withdrawn from it. In particular, considering first the embodiment of FIGS. 2–5, a filmstrip 2 will enter flared open end 112 of channel 103 and move lengthwise through channel 103 to slit 52. While passing through channel 103, edge sections 5 of filmstrip 2 will slide within edge guides 104. At the same time, spaced apart upper and lower surfaces 106, 108, respectively, allow image area 8 of filmstrip 2 to pass down channel 103 without rubbing against walls 106, 108, even in a transversely curled filmstrip. Preventing image area 8 from rubbing against surfaces 106, 108, both reduces friction and reduces wear on the image of a filmstrip.

During travel of filmstrip 2 toward slit 52, curved transition portion 116 of channel 103 forces the filmstrip to curve from straight portion 110, thereby urging a transversely curled film to straighten. Filmstrip 2 then enters through slit 52 adjacent guides 60. If the filmstrip is straight or has a longitudinal negative curl (FIG. 1E), edge sections 5 will contact inner surfaces 66 of guides 60 at a position close to slit 52. If the filmstrip has a longitudinal negative curl (FIG. 1D), edges of the filmstrip will contact respective guides at some point after the leading edge of the filmstrip. In any event, smooth inner surfaces 66 of guides 60 will contact only edge sections 5 of the filmstrip, after the filmstrip has entered the chamber and while it begins to form a coil between inner roller 80 and guides 60. This keeps frictional resistance to entry of the filmstrip into chamber 20, relatively low. In the meantime, as described above, as a result of inner surfaces 66 being inwardly spaced from transverse wall 51, the image area 8 of even a transverse negative curled filmstrip (FIG. 1B) is held from rubbing against transverse wall 51 as the filmstrip coils inside the chamber. This also reduces friction and promotes low rubbing of image area 8.

Providing an end of the filmstrip has remained outside of opening 112, the filmstrip can readily be withdrawn from take-up chamber 20. The operation is simply the reverse of when the filmstrip enters the chamber. However, during withdrawal the filmstrip may tend to form a tighter coil. It is particularly during filmstrip withdrawal that cylindrical inner roller 80 is particularly useful. As the filmstrip tends to become more tightly coiled during withdrawal, it might otherwise tend to bind on itself. However, in the case of chamber 20 such a tightly coiled filmstrip will wind on inner roller 80 which will then rotate to facilitate filmstrip withdrawal. Drum 80 has two raised edges and a central poriton 84. Raised edges 82 will contact edge sections 5 of filmstrip 2 wound on drum 80 and prevent image area 8 of even a transverse postive curved film (FIG. 1A) from rubbing against central portion 84. Thus, raised edges 82 also reduce friction and reduce wear of the filmstrip image area. Similarly, guides 60 and channel 103 also reduce friction and image area wear during filmstrip withdrawal in the same manner as filmstrip loading into chamber 20.

The second embodiment of FIGS. 6–10 will operate in substantially the same manner as the operation of the first embodiment just described. However, the second embodiment has straight portion 110 in line with tangent 120 of guides 80 at slit 52. This, coupled with the structure of guides 160 in this embodiment, already provide sufficiently low friction with a film that it is not always necessary to break a transverse curvature by using a curved transitional portion 116 of the first embodiment. Furthemore, rollers 172 will tend to contact edge sections 5 of a filmstrip 2 during entry and withdrawal of a filmstrip from the second embodiment of take-up chamber 20. Angle 186 being within the ranges previously discussed, ensures that wheels 174, 180 can provide rolling contact with edge sections 5 of a filmstrip 2, while not extending too far inward beyond inner surface 166 as to present an obstacle to a leading edge of a filmstrip 2 (particularly one which has a transverse positive or longitudinal positive curl). Furthermore, the construction of guides 160 with each wheels 170 having an axle 184 extending through an opening 171, ensures that there are no gaps in inner surface 166 (such that inner surface 166 is substantially continuous).

Figure 11:
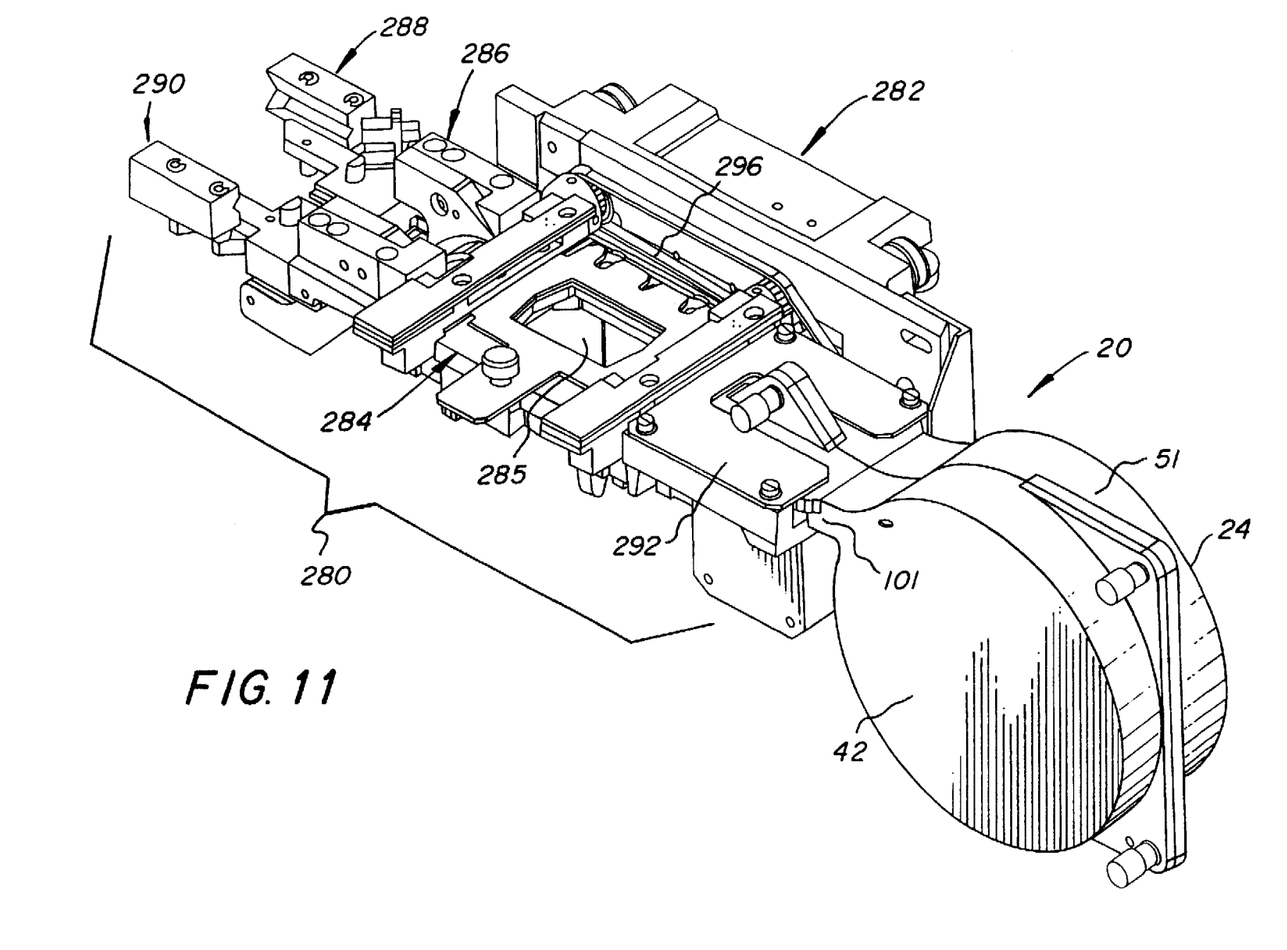
FIG. 11 is a persepective view of portions of a film scanner incorporating a take-up chamber of the present invention.
Figure 12:
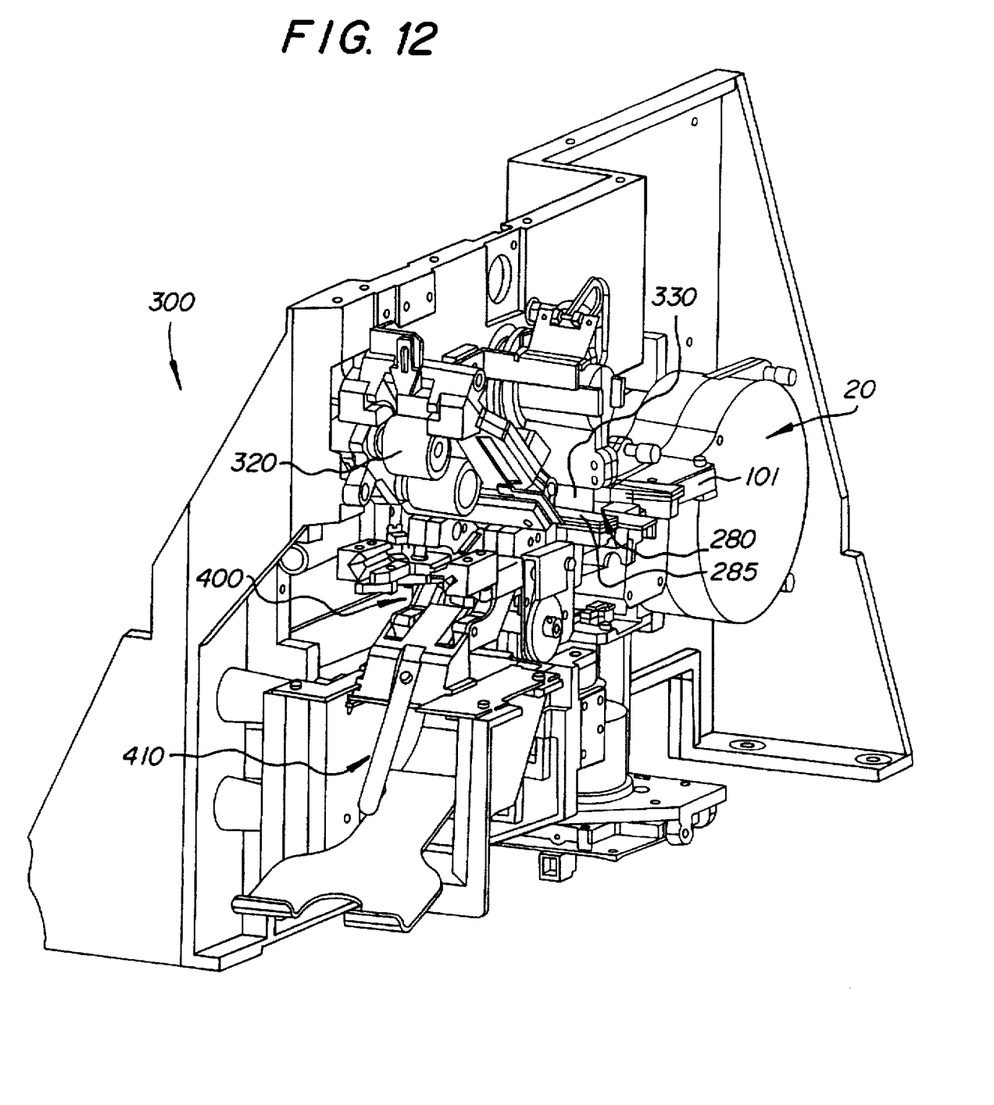
FIG. 12 is a perspective view of a scanner incorporating a take-up chamber of the present invention.

Turning now to use of a take-up chamber of the present invention in a scanner, FIG. 11 shows take-up chamber 20 on a portion of a scanner used for scanning image frames of a filmstrip. This portion of the scanner, and the overall scanner 300 in which it is incorporated, are are shown in FIG. 12. The same type of scanner is shown and described in allowed U.S. patent application Ser. No. 08/197,777, now U.S. Pat. No. 5,465,134 (but with a different take-up chamber, diverter and stationary exit chamber for receiving scanned filmstrip), as well as in U.S. patent application Ser. No. 08/616,330 entitled "Filmstrip Receiving Apparatus" by Robert Jones and Douglas Pfaff, filed on the same date as the present application.

In FIG. 11, take-up chamber 20 is depicted mounted in the filmstrip transport path of a filmstrip translation stage and scanning gate frame 280 for movement with frame 280 during line-by-line scanning of an image frame of a filmstrip (such as a filmstrip 2).

The scanning gate frame 280 supports left and right side slide scanning gate adjusting links 288, 290 attached at the left end thereof. Links 288, 290 can be used to support the moveable jaws of an additional slide scanning gate (not shown). A negative filmstrip such as a filmstrip 2, is guided into the film clamp and scanning gate assembly 284 by a film transport assembly (not shown) over a diverter assembly 286.

Alternatively, a filmstrip receiving apparatus as described in the co-filed patent application Ser. No. 08/616,330 (see above for details) and shown in FIG. 12, may be used, which apparatus includes an alternative diverter mechanism and stationary exit chamber for receiving scanned filmstrip. Scanning gate assembly 284 includes a scanning aperture 285. The details of the film scanner are not believed to be necessary to the understanding the present invention but may be found in the above-referenced applications, particularly Ser. Nos. 08/197,777 and 08/201,282.

The filmstrip take-up chamber 20 is attached at the other side of the film clamp and scanning gate assembly 284 by clamp assembly 292 so that filmstrip channel 103 is aligned with the filmstrip transport path. The clamp assembly 292 fits around the composite channel housing 101, and is fastened to a flange 294 extending in parallel with the filmstrip transport path.

The scanning gate frame 280 is supported by translation carriage 282. Carriage 282 is movable on a track (not shown) under the control of the carriage drive motor (not shown) to either reposition the slide scanning gate or the film clamp and scanning gate assembly 284 into the scanning position. The take-up chamber 20 of the present invention is only used in the scanning of elongated filmstrips having two or more image frames.

As shown in FIG. 12, scanning gate assembly 284 is positioned such that during scanning, its scanning aperture 285 is positioned beneath a light source 330 and above a CCD sensor (not shown).

Assuming that a negative filmstrip is to be scanned, the carriage 282 translates until the film clamp and scanning gate assembly 284 are positioned in the scanning station and the film clamp is released to allow the filmstrip to be advanced past the scanning aperture 285. The negative filmstrip leading end is advanced from above by drive 320 through diverter 400. Diverter 400 directs the filstrip into the nip of a first drive roller assembly (obscured by other components). The first drive roller assembly is driven by a film transport motor (not shown) in carriage 282 at the left side of the film clamp and scanning gate assembly 284, through the drive belt 296. The filmstrip is then advanced to the right through the scanning aperture 285 by the first drive roller assembly and into the nip of a second drive roller assembly on the other side of the scanning aperture that is also driven through drive belt 296.

The filmstrip leading end is continuously driven at relatively high speed through scanning aperture 285 and beneath light source 330 by the first and second drive roller assemblies, and a low resolution pre-scan operation is conducted as described above and in the above-referenced co-pending applications. The CCD and associated eletronic components (not shown) derive a first set of image data for each scanned image frame. At the same time, position data is derived by sprocket hole perforation sensors for use in the detection of drive slippage or jamming and the correct positioning of the image frames during the high resolution main-scan operation of the image frames in the reverse direction. As this proceeds, the filmstrip is loaded into the attached take-up chamber 20, in the manner already described, until the last image frame is pre-scanned. Rotation of the drive roller assemblies through drive belt 296 is halted with the trailing end of the filmstrip engaged in the nip of the right side drive roller assembly.

After all image frames are pre-scanned, rotation of the drive roller assemblies is reversed, and the filmstrip is driven to the left until an image frame is positioned in the scanning aperture 285, beneath light source 330 and above the CCD sensor, using the positioning data accumulated in the pre-scan. Once the filmstrip image frame is positioned for scanning, the drive belt 296 is halted and the film clamp is engaged. The carriage 282 is then incrementally driven to translate the clamped film image frame past the stationary scanning components (light source 330 and CCD sensor) to derive a second set of image data in the form of high resolution main-scan image data. During that translation and scanning, the negative filmstrip is itself motionless in scanning gate 284, and the image frames to be withdrawn and scanned next are motionless inside the take-up chamber 20. The process is repeated to complete the main-scan of each image frame, and the filmstrip is diverted below diverter 400 into the stationary exit chamber 410.

All of the components depicted in FIG. 11 are fixed for movement together, so that the driven carriage 82 can provide the above described translation movement during high resolution line-by-line scanning of the image frame in the scanning aperture. Since the take-up chamber 20 also moves during translation, the filmstrip 2 remains stationary between the film clamp and scanning gate assembly 284 and the take-up chamber 20, avoiding any binding or movement of dust particles into the cavity 14 that could take place if the filmstrip 12 were to move relative to chamber 10.

The preceding examples are set forth to illustrate specific embodiments of this invention and are not intended to limit the scope of the invention. It will be understood that variations and modifications can be effected within the spirit and scope of the invention.

PARTS LIST

2 Filmstrip
4 Longitudinal Edges
5 Contact Edge Sections
6 Perforations
8 Image Area
10 Image Areas
12 Filmstrip
20 Chamber
24 Half-Section
26 Side Wall
27 Transverse Wall Portion
28 Flanges
30 Bolts
42 Half-Section
44 Sidewall
46 Flanges
48 Threaded Bores
50 Transverse Wall Portion
51 Transverse Wall
52 Slit
53 Line
54 Circular Hub
60 Guides
62 Gap
66 Inner Surface
68 Outer Surface
69 S-Shaped End
80 Inner Roller
82 Carriage
84 Central Portion
86 Open Middle
100 Portions of Half Sections
101 Channel Housing
102 Portions of Half Sections
103 Filmstrip Channel 104 Edge Guides
106 (Upper) Surface
108 (Lower) Surface
110 Straight Portion
112 Flared Open End
114 Position
116 Curved Portion
117 Broken Line
120 Tangent Line
160 Flat Guides
162 Gap
166 Inner Surface
168 Surface
170 Sides
171 Opening
172 Rollers
174 Wheels
176 Wider Portion
178 Thinner Portion
179 Outer Surfaces
180 Wheels
181 Outer Surfaces
182 Opening
184 Axis
186 Angle
188 Arc
280 Frame
282 Carriage
284 Axle
285 Scanning Aperture
286 Diverter Assembly
287 Flipper
288 (Left) Adjusting Link
290 (Right) Adjusting Link
292 Clamp Assembly
294 Flange
296 Drive Belt
300 Scanner
320 Drive
330 Light Source
400 Diverter
410 Stationary Exit Chamber

We claim:

1. A take-up chamber for receiving an elongated filmstrip having a predetermined width between the longitudinal edges thereof and an image area less than the width, comprising:
   a) a chamber housing for accommodating the filmstrip within the chamber, the housing having first and second side walls spaced apart to accommodate the width of the filmstrip, a lateral wall extending between the first and second side walls, and a slit extending through the lateral wall and between the first and second side walls through which the filmstrip may be introduced or withdrawn from the chamber; and
   b) two parallel laterally spaced generally circular guides extending around the inside of said chamber from adjacent one side of the slit to the other side of the slit, each guide having a substantially continuous inner surface, to contact only respective longitudinal edges of a filmstrip and cause the filmstrip to wind into a roll within the chamber as the filmstrip is advanced through the slit.

2. A take-up chamber according to claim 1 wherein the inner surface of each guide is convex.

3. A take-up chamber according to claim 1 additionally comprising a filmstrip channel housing extending laterally outward from the chamber housing, the channel being in communication with the slit and being dimensioned to guide the filmstrip lengthwise into the chamber.

4. A take-up chamber according to claim 3 wherein the channel has opposed edge guides and spaced apart upper and lower surfaces therebetween so as to guide the edges of the filmstrip without the image area of a transversely curled film contacting the upper and lower surfaces.

5. A take-up chamber according to claim 3 wherein the channel has a straight portion remote from the chamber housing which is non-tangential to the guides at the slit, and a curved transitional portion which curves from the straight portion toward a direction parallel with the tangent to the guides at the slit.

6. A take-up chamber according to claim 1 additionally comprising a plurality of rollers spaced along each guide with the axis of each roller positioned radially inward from the inner surface of its corresponding guide, such that the arc of the roller surface extending beyond the guide inner surface defines an angle of less than 90 degrees.

7. A take-up chamber according to claim 6 wherein the arc defines an angle of less than 70 degrees.

8. A take-up chamber according to claim 6 wherein: each guide has opposed sides extending between the inner surface and an outer surface; and wherein each roller has an axle extending through a lateral hole in the guide and two wheels on respective ends of the axle and adjacent respective sides of the guide.

9. A take-up chamber according to claim 1 additionally comprising a cylindrical inner roller disposed within the chamber and extending between the first and second side walls, to contact and rotate with an inner-most coil of a film roll formed by the filmstrip in the housing, as the film-strip is withdrawn from the take-up chamber.

10. A take-up chamber according to claim 9 wherein said inner roller has raised edge portions adjacent respective sides of the chamber and a central portion therebetween, so that edges of a transversely curved filmstrip can contact the raised edges without the image area of the filmstrip contacting the central portion.

11. A scanner for scanning image frames of a filmstrip advanced into a scanning station, comprising:
   a) a scanner in the scanning station to scan the image frames of the filmstrip and derive image data related to the scanned image frame;
   b) a filmstrip translation stage in the scanning station for translating each image frame of the filmstrip advanced into the scanning station past the scanner; and
   c) a take-up chamber comprising:
      i) a chamber housing for accommodating the filmstrip within the chamber, the housing having first and second side walls spaced apart to accommodate the width of the filmstrip, a lateral wall extending between the first and second side walls, and a slit extending through the lateral wall and between the first and second side walls through which the filmstrip advanced past the scanner may be introduced or withdrawn from the chamber; and
      ii) two parallel laterally spaced generally circular guides extending around the inside of said chamber from adjacent one side of the slit to the other side of the slit, each guide having a substantially continuous inner surface, to contact only respective longitudinal edges of a filmstrip and cause the filmstrip to wind into a roll within the chamber as the filmstrip is advanced through the slit.

12. A scanner for scanning image frames of discrete filmstrips advanced into and from a scanning station, comprising:

a) a scanner in the scanning station for scanning the image frames of the filmstrip and deriving image data related to the scanned image frame;

b) a filmstrip translation stage in the scanning station for translating past the scanner each image frame of the filmstrip advanced into the scanning station for scanning in a forward direction, to derive a first set of image data for each scanned image frame, and for translating the same scanned image frames of the filmstrip in a reverse direction past the scanner to derive a second set of image data for each such scanned image frame; and c) a take-up chamber associated with the translation stage for movement with the translated image frames of the filmstrip in both the forward and reverse scanning directions, whereby the filmstrip in the take-up chamber does not move relative to the take-up chamber during scanning, comprising:

i) a chamber housing for accommodating the filmstrip within the chamber, the housing having first and second side walls spaced apart to accommodate the width of the filmstrip, a lateral wall extending between the first and second side walls, and a slit extending through the lateral wall and between the first and second side walls through which the filmstrip advanced past the scanner may be introduced or withdrawn from the chamber; and ii) two parallel laterally spaced generally circular guides extending around the inside of said chamber from adjacent one side of the slit to the other side of the slit, each guide having a substantially continuous inner surface, to contact only respective longitudinal edges of a filmstrip and cause the filmstrip to wind into a roll within the chamber as the filmstrip is advanced through the slit.

13. A scanner according to claim 11 wherein the inner surface of each guide of the take-up chamber is convex.

14. A according to claim 11 wherein the take-up chamber additionally comprises a plurality of rollers spaced along each guide with the axis of each roller positioned radially inward from the inner surface of its corresponding guide, such that the arc of the roller surface extending beyond the guide inner surface defines an angle of less than 90 degrees.

15. A scanner according to claim 11 wherein the take-up chamber additionally comprises a filmstrip channel housing extending laterally outward from the chamber housing, the channel being in communication with the slit and being dimensioned to guide the filmstrip lengthwise into the chamber.

16. A scanner according to claim 15 wherein the channel of the take-up chamber has opposed edge guides and spaced apart upper and lower surfaces so as to guide the edges of the filmstrip without the image area of a transversely curled film contacting the upper and lower surfaces.

17. A scanner according to claim 15 wherein the channel of the take-up chamber has a straight portion remote from the chamber housing which is non-tangential to the guides at the slit, and a curved transitional portion which curves from the straight portion toward a direction parallel with the tangent to the guides at the slit.

18. A scanner according to claim 15 wherin the take-up chamber additionally comprises a cylindrical roller disposed within the chamber and extending between the first and second side walls, to contact and rotate with an inner-most coil of a film roll formed by the filmstrip in the housing, as the film-strip is withdrawn from the take-up chamber.

19. A scanner according to claim 18 wherein the roller in the take-up chamber has raised edge portions adjacent respective sides of the chamber and a central portion therebetween, so that edges of a transversely curved filmstrip can contact the raised edges without the image area of the filmstrip contacting the central portion.

* * * * *